US012681755B2

(12) United States Patent　　　　　(10) Patent No.:　US 12,681,755 B2
Pande et al.　　　　　　　　　　　　　(45) Date of Patent:　　Jul. 14, 2026

(54) INTELLIGENT/FAST DATA CONFIDENCE FABRIC NETWORK DELIVERY

(71) Applicant: Dell Products L.P., Round Rock, TX (US)

(72) Inventors: Pankaj Pande, Carlingford (AU); Stephen J. Todd, North Andover, MA (US)

(73) Assignee: Dell Products L.P., Round Rock, TX (US)

( * ) Notice: Subject to any disclaimer, the term of this patent is extended or adjusted under 35 U.S.C. 154(b) by 582 days.

(21) Appl. No.: 18/194,774

(22) Filed: Apr. 3, 2023

(65) Prior Publication Data

US 2024/0330040 A1　Oct. 3, 2024

(51) Int. Cl.
　　*G06F 9/48*　　　　(2006.01)
　　*G06F 9/50*　　　　(2006.01)
(52) U.S. Cl.
　　CPC ............ *G06F 9/4856* (2013.01); *G06F 9/505* (2013.01)
(58) Field of Classification Search
　　CPC ..... G06F 9/4856; G06F 9/505; H04L 63/126; H04L 45/02
　　See application file for complete search history.

(56) References Cited

U.S. PATENT DOCUMENTS

| | | | |
|---|---|---|---|
| 7,539,869 | B1 | 5/2009 | Mullan et al. |
| 8,595,484 | B2 | 11/2013 | Thomas et al. |
| 10,757,111 | B1 | 8/2020 | Marek et al. |
| 10,986,076 | B1 | 4/2021 | Bendickson et al. |
| 11,544,253 | B2 | 1/2023 | Todd |
| 2005/0044356 | A1 | 2/2005 | Srivastava et al. |
| 2009/0144807 | A1 | 6/2009 | Zheng |
| 2010/0031027 | A1 | 2/2010 | Thomas et al. |
| 2014/0003232 | A1* | 1/2014 | Guichard ............ H04L 67/1029 370/230 |
| 2014/0126573 | A1 | 5/2014 | Matthews et al. |
| 2015/0007271 | A1 | 1/2015 | Wong et al. |
| 2016/0191325 | A1 | 6/2016 | Pacella et al. |
| 2016/0269247 | A1* | 9/2016 | Chakradhar ............ H04L 67/12 |
| 2017/0310595 | A1* | 10/2017 | Avidar ................. H04L 47/125 |

(Continued)

FOREIGN PATENT DOCUMENTS

WO　　　2023/043598 A1　　3/2023

OTHER PUBLICATIONS

S. J. Patil al et., CLBNSRM—Confidence Level Based Unblend Neighbor Selection & Blend Node Report Based Optimized Route Formation in Manet, Mar. 2020, International Journal of Computer Networks & Communications (IJCNC) vol. 12, No. 2, pp. 109-129 (Year: 2020).

(Continued)

*Primary Examiner* — Sisley N Kim
(74) *Attorney, Agent, or Firm* — Workman Nydegger

(57) ABSTRACT

Routing data in a data confidence fabric network. A confidence fabric adds confidence information to data delivered through the data confidence fabric network. A route is selected by considering inputs that include the trust insertion capabilities of nodes in potential routes, resource usage of nodes in the potential routes, and/or historical delivery times for the potential routes. One of the potential routes is selected as a selected route. The selected route may be based on best anticipated delivery time in view of the inputs.

20 Claims, 8 Drawing Sheets

(56)  References Cited

U.S. PATENT DOCUMENTS

| | | | |
|---|---|---|---|
| 2019/0036801 A1 | 1/2019 | Natarajan et al. | |
| 2020/0104527 A1 | 4/2020 | Koster et al. | |
| 2020/0233978 A1 | 7/2020 | Sofia | |
| 2020/0382560 A1 | 12/2020 | Woolward et al. | |
| 2021/0111994 A1* | 4/2021 | Li | H04L 41/142 |
| 2021/0306256 A1 | 9/2021 | Ward et al. | |
| 2021/0328905 A1 | 10/2021 | Skalecki | |
| 2021/0406248 A1* | 12/2021 | Todd | G16Y 30/00 |
| 2022/0043721 A1 | 2/2022 | Shemer et al. | |
| 2022/0086781 A1 | 3/2022 | Kwon et al. | |
| 2022/0100858 A1 | 3/2022 | Todd | |
| 2022/0100879 A1 | 3/2022 | Todd et al. | |
| 2022/0138325 A1 | 5/2022 | Todd et al. | |
| 2023/0004913 A1 | 1/2023 | Reineke et al. | |
| 2023/0077354 A1 | 3/2023 | Moon et al. | |
| 2023/0104424 A1 | 4/2023 | Diachina et al. | |
| 2023/0164174 A1 | 5/2023 | Heller et al. | |
| 2023/0247040 A1 | 8/2023 | Luttwak et al. | |
| 2024/0031376 A1 | 1/2024 | Lichtenstein et al. | |
| 2024/0235984 A1 | 7/2024 | Chunduri | |
| 2024/0333629 A1 | 10/2024 | Pande et al. | |

OTHER PUBLICATIONS

Dartois et al., "Tracking Application Fingerprint in a Trustless Cloud Environment for Sabotage Detection," IEEE, 2019, 9pg. (Year: 2019).
Priebe et al., "CloudSafetyNet: Detecting Data Leakage between Cloud Tenants," ACM, 2014, 12pg. (Year: 2014).
Todd, Steve, "Project Alvarium: The Future of Edge Data," Dell, 2020, 39pg. (Year: 2020).
Yao et al., "A trust management framework for software-defined network applications," Wiley, 2018, 18pg. (Year: 2018).

* cited by examiner

INTELLIGENT/FAST DATA CONFIDENCE FABRIC NETWORK DELIVERY

RELATED APPLICATIONS

This application is related to U.S. Ser. No. 16/910,451, filed Jun. 24, 2020, and titled AUTOMATED DATA ROUTING IN A DATA CONFIDENCE FABRIC, and to U.S. Ser. No. 18/194,726, filed Apr. 3, 2023 titled APPLICATION DISCOVERY AND DCF OVERLAY, which are incorporated by reference in their entirety.

FIELD OF THE INVENTION

Embodiments of the present invention generally relate to data confidence fabric networks and data delivery in data confidence fabric networks. More particularly, at least some embodiments of the invention relate to systems, hardware, software, computer-readable media, and methods for intelligently routing traffic in multi-path data confidence fabric networks.

BACKGROUND

Computing and other electronic devices come in a variety of types and form factors and have varying capabilities. Many of these devices generate data that may be used by various applications. There is often a question, however, about the value of the data. In other words, applications benefit from using data in which there is high confidence. Applications that run using data associated with high confidence levels typically generate more reliable results and outputs. Applications also benefit from data that is delivered quickly, particularly when the applications are time-sensitive.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
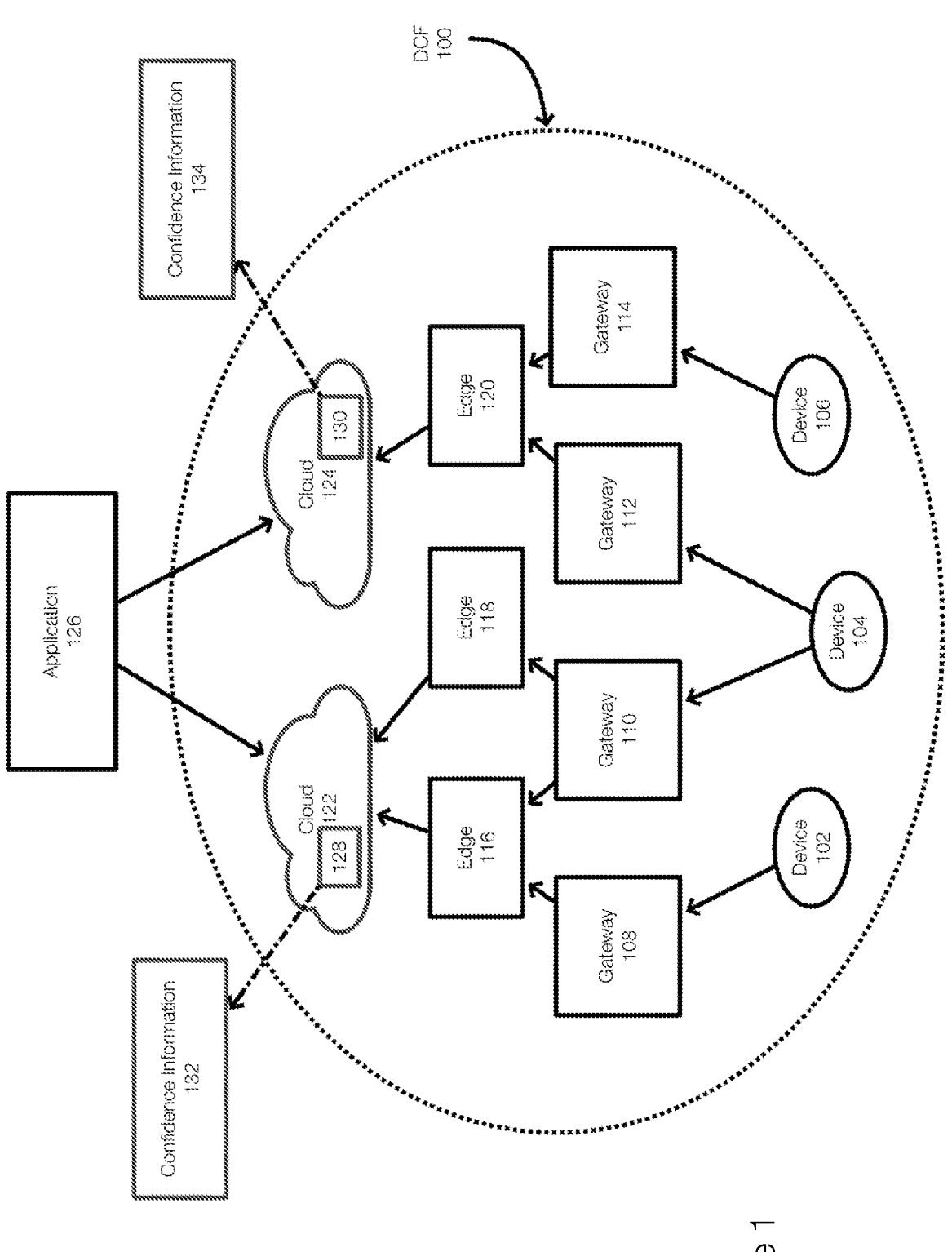
FIG. 1 discloses aspects of a computing system such as a data confidence fabric network.

Embodiments of the present invention generally relate to computing systems or ecosystems such as data confidence fabrics (DCFs). In one example, a DCF is a system or network of hardware (computers, servers, routers, network interface cards, storage including immutable storage and/or other hardware) that is provisioned (e.g., with software, services) to score or rank data that may be ingested into and/or transmitted through the DCF. The data ingested into the DCF can be made available to applications, which may also be part of the DCF. The applications can leverage the confidence scores of the data.

A DCF is generally configured to add confidence information to data. The confidence information can take various forms including a confidence score and associated metadata. The confidence information can be added from a hardware perspective and/or a software perspective.

Embodiments of the invention relate to DCF configurations in which data or packet routing is considered. In the context of routing data, aspects of data confidence information may relate to data delivery or time required to deliver data to a destination such as an application. The ability to deliver data quickly or in a timely fashion can be reflected in the confidence information, which in turn allows an application to have more confidence in data that is delivered in a timely fashion.

A DCF, by way of example only, may be an architecture and set of services that allow data to be ingested and used by applications. The DCF may include trust insertion technologies (hardware and/or software) that are applied to the data as the data flows through the DCF. Each time a trust insertion technology is applied, an annotation may be made in a ledger or other structure and the confidence score may be changed. Thus, the confidence score of data provides a view into the trustworthiness of the data to an application. Trust or confidence information can be added from both hardware and software perspectives.

A DCF may include various interconnected hardware environments (e.g., nodes). These nodes may have varying hardware capabilities that are examples of trust insertion technologies or hardware-assisted trust insertion technologies. The hardware is configured such that as data flows from data sources to storage or to applications in a DCF system, scores can be attached or associated with the data. As the data is handled by various forms of trust insertion technologies, the overall score or ranking (e.g., a confidence or trustworthiness score) of the data may change. The data scored or ranked in the DCF system may be stored in various locations, such as a data lake, in a datacenter, Public Cloud data storage service, or the like. The confidence information, which may include a confidence score or rank, is made available to one or more applications or other clients or users. The confidence information may include, in addition to a confidence score and/or rank, tables, audit information, and the like.

Confidence scores, which may be determined from hardware aspects and/or software aspects of a DCF, allow an application to explore or exploit the data for potential analysis or consumption. The confidence score or rank of the data allows an application to understand or account for the trustworthiness of the data. For example, the confidence score of the data may have an impact on whether the data is actually used by the application. An application may require a minimum confidence score or have other requirements related to the confidence score.

Embodiments of the invention, by way of example, provide a DCF system or configuration that provides or establishes defined hardware boundaries, trusted and auditable node connectivity within the DCF, and trusted and auditable interactions with other DCFs. A DCF is able to give or associate data with scores from individual trust insertion technologies that can be combined in multiple ways to determine a final score or rank that relates to the trustworthiness of the data. The scores provided from a hardware perspective can be maintained separately from confidence scores from a software perspective. The scores can also be combined into an overall score.

For example, an application operating in a nuclear facility may need to use data that is very trustworthy (have a high confidence score) while data that is used by an application to control lights in a home may not need to be as trustworthy (a lower confidence score is acceptable). In the context of a nuclear facility, an application may require that the hardware handling the data be firewalled from outside sources, provide hardware assisted encryption, deterministic routing, or the like or combination thereof. Applying these trust insertion technologies improves the confidence score of data.

FIG. 1 illustrates an example of a data confidence fabric network (DCF 100). The DCF 100 includes varies computing and hardware components, connections, and environments. The DCF 100 is configured to add confidence information including confidence scores to data flowing in the DCF 100.

FIG. 1 illustrates examples of data routes or paths in the DCF 100. A specific path of specific data may be referred to as a graph. In FIG. 1, data generated by devices 102, 104, and 106 may flow through multiple levels or multiple hardware environments such as gateways 108, 110, 112, and 114, edges 116, 118, 120, and clouds 122 and 124. In one example, the data may be stored in the clouds 122 and 124.

As the data 128 and the data 130 flow through the DCF 100, the DCF 100 may add confidence information to the data. After flowing through the DCF 100, the data 128 (which may have been generated by one of the devices 102, 104, and/or 106) is stored in the cloud 122 and made available to an application 126. Similarly, the data 130 may be made available to the application 126. The data 128 is associated with confidence information 132 and the data 130 is associated with confidence information 134. The confidence information 132 and 134 may include confidence scores, provenance data, audit trails, data graphs, applied trust insertion technologies, or the like.

Data flowing through a DCF is typically more valuable and useful at least because the confidence scores or ranks of DCF annotated data allow an application to decide how to trust and/or use the associated data.

Figure 2:
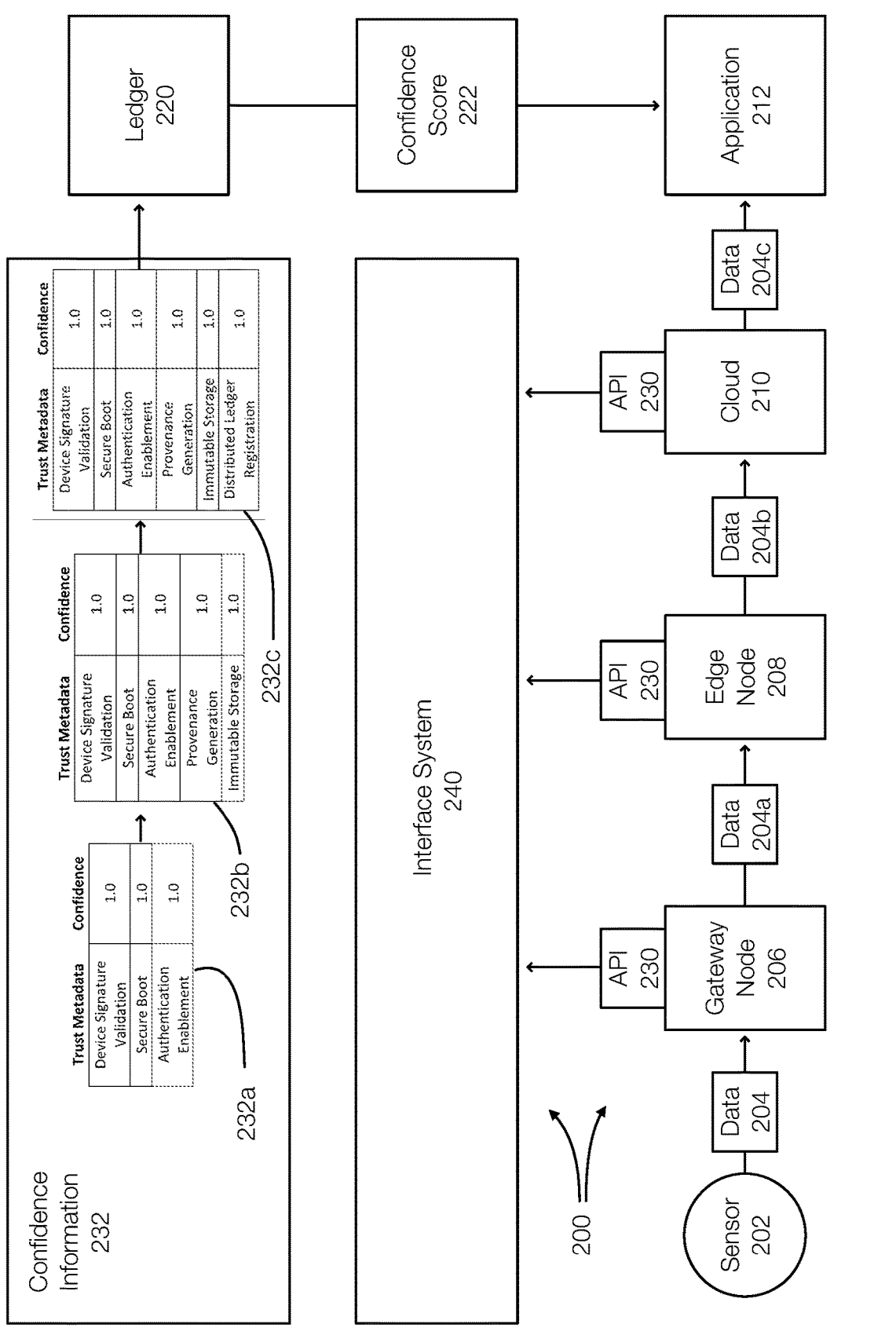
FIG. 2 discloses additional aspects of a computing system such as a data confidence fabric network.

FIG. 2 discloses additional aspects of a data confidence fabric network. FIG. 2 illustrates a DCF 200, which is an example of the DCF 100. In the DCF 200, data 204 is generated by a sensor 202 (or other devices such as user devices) and is ingested into the DCF 200. The data 204 may be received at a gateway node 206, which interfaces with an interface system 240 of the DCF 200 to annotate the data 204 with confidence information.

As illustrated in FIG. 2, confidence information 232 is generated and accompanies the data 204 as the data 204 is routed in the DCF 200. At the gateway node 206, for example, the data 204 is annotated with confidence information 232a, which relates to trust insertion technologies such as a device signature validation, a secure boot, and an authentication enablement. Each of these trust insertion technologies, in this example, are performed and add a score that is reflected in the confidence information 232a. More specifically, the gateway node 206 may access an interface system 240 using an application programming interface (API) 230 to record the confidence information 232a.

Next, the data 204a (which is the annotated data 204 after passing through the gateway node 206) is routed to an edge node 208 and additional confidence information is added as reflected in the confidence information 232b. Thus, the data 204a arrives at the edge node 208 and is already associated with the confidence information 232a. The edge node 208 may add apply additional trust insertion technologies such as provenance generation and immutable storage. These trust insertion technologies allow the confidence information to be augmented as illustrated by the confidence information 232b. Thus, the data 204b leaving the edge node 208 is associated with the confidence information 232b.

Next, the data 204b arrives at the cloud 210 and additional confidence information is added as illustrated by the confidence information 232c. Thus, the cloud 210 may apply or use a trust insertion technology such as distributed ledger registration and the confidence information 232 is updated as shown by the confidence information 232c.

In one example, the confidence information 232 is stored in a ledger 220. As a result, the confidence information 232 is secure and can be accessed by an application 212. In this example, the data 204 arrives at the application 212 as the annotated data 204c, which is associated with the confidence information 232c and with a confidence score of, in this example, 6.0. The application 212 thus has insight into the trustworthiness of the data 204 generated at the sensor 202.

The confidence score can be generated in different ways. The various trust insertion technologies may be weighted or have different scores. For example, the DCF 200 may be associated with a maximum confidence score (e.g., 10). If the data 204 had followed a different route in the DCF 200, the confidence score may be different. For example, other nodes may have trust insertion technologies that could have increased the confidence score of the data 204. Different routes may also result in lower confidence scores.

Embodiments of the invention relate to routing data in a DCF such as the DCF 100 or the DCF 200. However, the routing may be performed in a manner that accounts for characteristics of the route. For example, a route for data may be based on one or more of trust capabilities (e.g., trust insertion technologies) per route in an attempt to maximize the confidence score, based on the resource availability of the nodes in the available or potential routes, and on historical data (e.g., average or expected delivery times) associated with specific routes in the DCF 200. Trust capabilities, resource availability, and/or delivery times can be used or combined in different manners in order to select a route for the data. Thus, the data is routed in a manner that accounts for trust capabilities, speed of delivery, and/or historical outcomes.

In order to forward data along a route or path in a DCF, embodiments of the invention may rely on a capabilities graph, an example of which is described in U.S. patent application Ser. No. 18/194,726, filed Apr. 3, 2023, incorporated by reference in its entirety.

Figure 3:
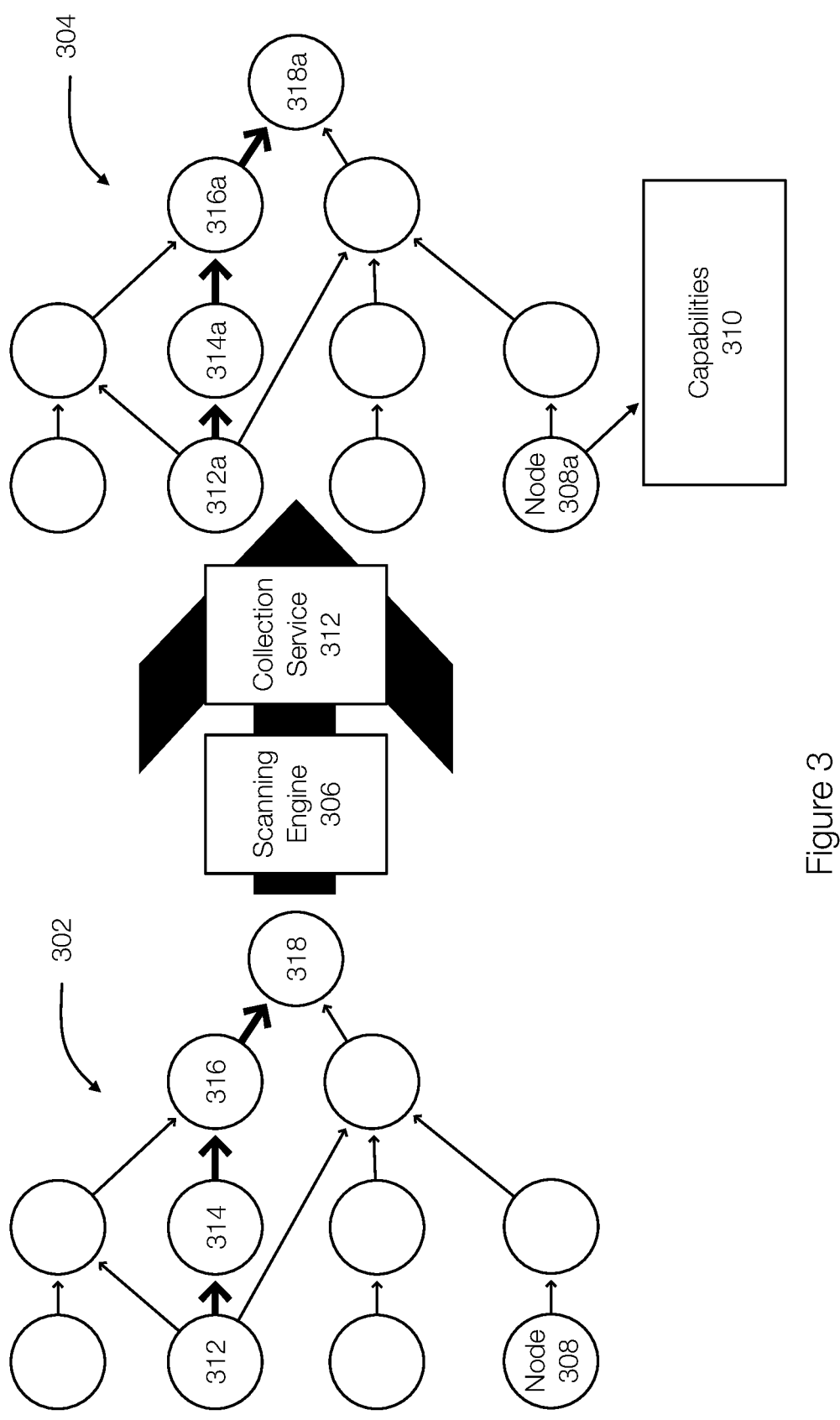
FIG. 3 discloses aspects of a capabilities graph that identifies trust capabilities of nodes in a data confidence fabric network.

FIG. 3 discloses aspects of a capabilities graph. More specifically, FIG. 3 illustrates a DCF 302, which is an example of the DCF 100 or the DCF 200. The DCF 302 includes multiple nodes of various types (e.g., gateway, edge, cloud). A scanning engine 306 may be configured to evaluate the nodes in the DCF 302 to determine their capabilities or, more specifically, their trust insertion technologies. In one example, the scanning engine 306 may be deployed to each of the nodes. This allows the scanning engine 306 to scan each of the nodes and determine the trust or security that the nodes are capable of providing to data being ingested or routed in the DCF 302.

The scanning engine 306 may report the discovered capabilities to a collection service 312. The report may identify a list of capabilities. The report may also include metadata such as a high-level hardware confidence score for the node, network connectivity metadata to nearby nodes, or the like. The collection service 312 uses the reports from all of the nodes in the DCF 302 and may generate a capabilities graph 304.

The capabilities graph 304 may represent the nodes of the DCF 302. However, each of the nodes in the capabilities graph 304 are associated with confidence information. For example, the node 308a in the capabilities graph 304, which corresponds to the node 308 in the DCF 308, is associated with confidence information in the form of capabilities 310. The capabilities 310 may indicate that the node 308 includes hardware-based trust insertion technologies such as secure enclave or trusted execution environment. The capabilities 310 may also identify software trust insertion technologies such as encryption, authentication support, or the like. Each of the nodes in the capabilities graph 304 is associated with or includes corresponding capabilities in the form of trust insertion technologies and/or other metadata. Thus, the capabilities graph 304 is configured to identify the capabilities and can be used when routing data in the DCF 302. Each route (or partial route) in the DCF 302 can be evaluated from a capabilities perspective. For example, if the path illustrated by the bolded arrows in FIG. 3 is selected as a route for data or packets, the data would traverse the nodes 312, 314, 316, and 318. When evaluating the route, the capabilities of the nodes 312a, 314a, 316a, and 318a in the capabilities graph 304 can be aggregated to determine the capabilities of that specific route. This allows the capabilities of different routes to be compared and evaluated.

Figure 4:
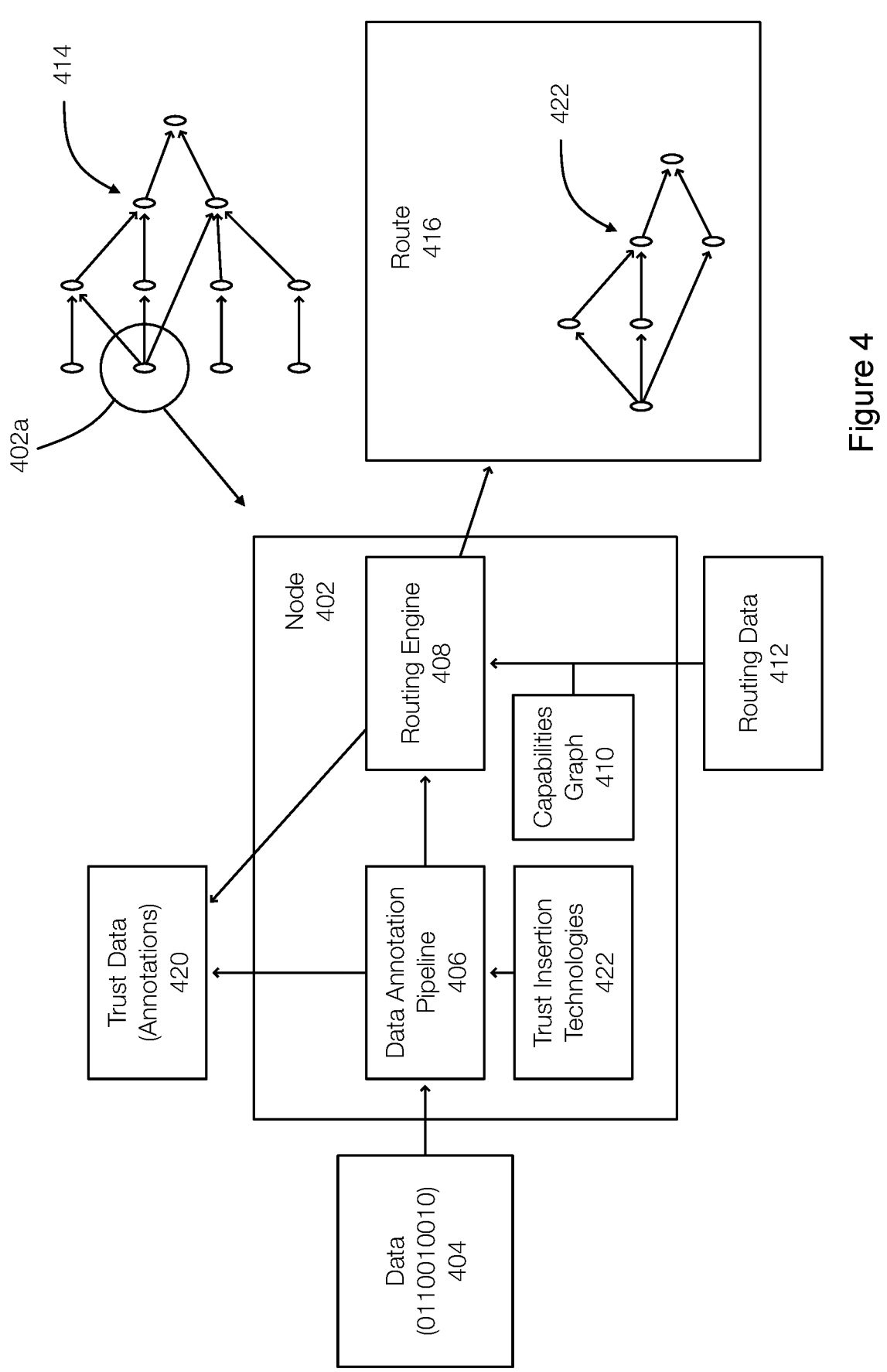
FIG. 4 discloses aspects of selecting a route for routing data or packets in a data confidence fabric network.

FIG. 4 discloses aspects of routing data in a data confidence fabric network. FIG. 4 illustrates a capabilities graph 414 that is, in this example, is delivered to the node 402 and stored as the capabilities graph 410. The node 402 is represented in the capabilities graph as the node 402a. The capabilities graph 410 may be updated over time, when nodes in the DCF change, when the DCF is updated, when nodes are added/removed from the DCF, and/or other reasons.

In FIG. 4, data 404 is received at the node 402. If the node 402 is a gateway node, the data 404 may be received from a sensor or other device (e.g., user computing device). The data 404 enters a data annotation pipeline 406. The data annotation pipeline 406 may process the data 404 such that trust insertion technologies 422 may be applied to the data 404. The data annotation pipeline 406 may cause confidence information 420 to be generated and written to the confidence information structure (e.g., a distributed ledger) via a data confidence fabric interface (e.g., the interface system 240).

FIG. 4 further illustrates that the node 402 may invoke a routing engine 408 that is configured to generate or select a route 416 from among available or potential routes. More specifically, based on available connections in one example, the node 420 may determine or identify (in this example) three potential routes 422 for the data in the DCF. The routing engine 408 may select one of the routes 422 based on the capabilities graph 410 and/or other routing data 412. Examples of the routing data 412 include resource utilization at other nodes in the routes 422 and/or historical routing data such as average delivery times. The output of the routing engine 408, which may include a selected route from among the routes 422, may be included in the annotations 420.

In one example, the selected route may also be associated with confidence information that may influence the confidence score of the data 404. For example, the anticipated delivery time can be reflected in the confidence score. Thus, selecting a route with a better delivery time may result in a better confidence score. However, this also depends on other factors such as the capabilities of the selected route. Selecting a route with good delivery times may be important, for example, to applications that require fresh data or timely delivered data. The ability to deliver data more quickly may raise the confidence score of the data at least because the data may be more relevant when fresh while data that has become stale is less relevant.

Figure 5:
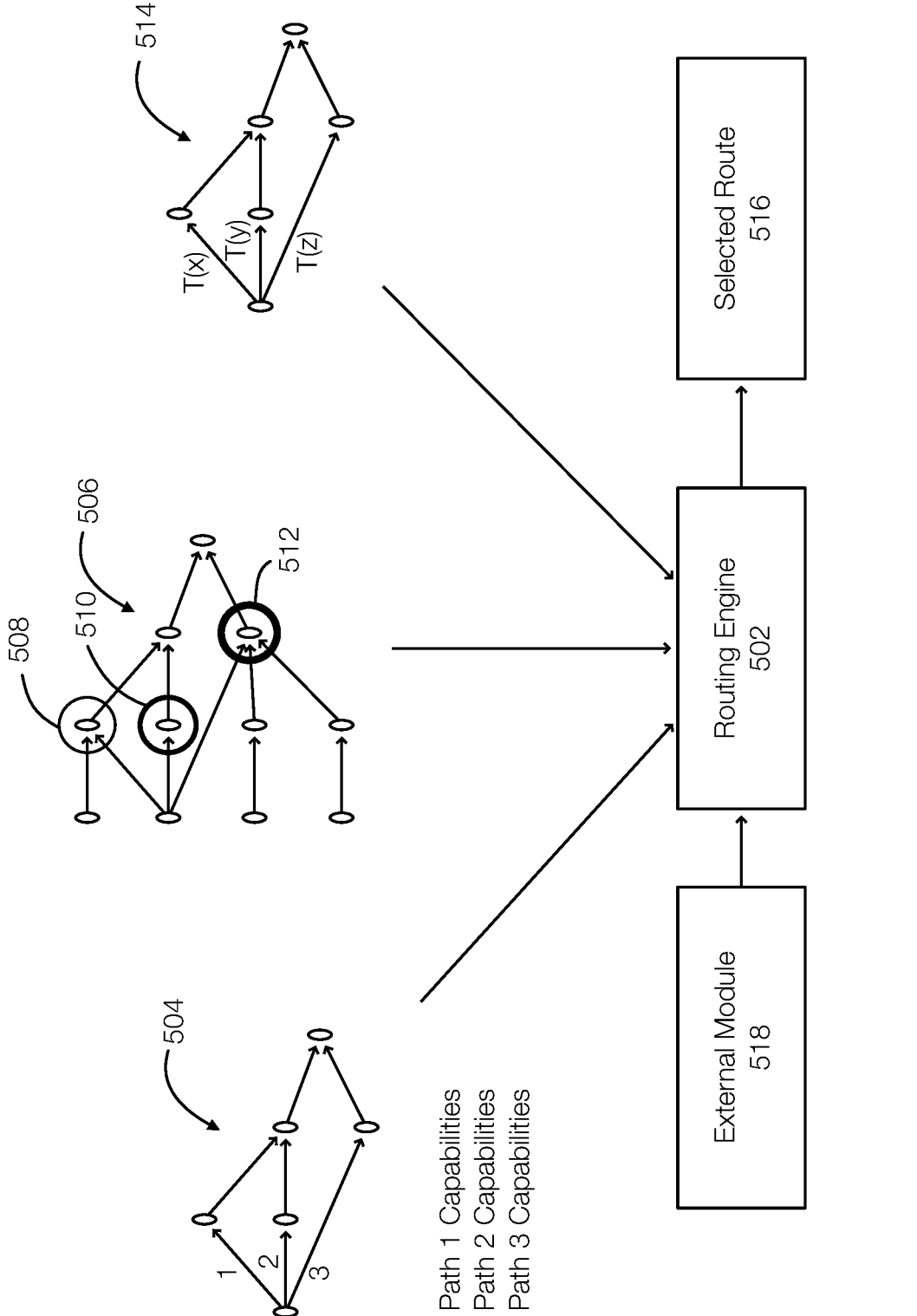
FIG. 5 discloses additional aspects of routing data or packets in a data confidence fabric network.

FIG. 5 discloses additional aspects of selecting a route or path in a DCF. FIG. 5 illustrates a routing engine 502 that may consider factors such as potential routes 504 and their capabilities, resource usage 506, and historical data 514. More specifically, the capabilities graph can be used to identify the capabilities of possible paths or routes. The capabilities can be considered from the perspective of individual nodes and/or from all the nodes in a potential route collectively.

FIG. 5 illustrates potential routes for data including routes 1, 2, and 3. The capabilities of each route are determined from the capabilities graph by the routing engine 502.

Selecting a route based on capabilities may have an impact on the confidence score at least because each path may be associated with different combinations of trust insertion technologies.

The resource usage 506 includes information that can be refreshed as needed, periodically, or the like. The thickness of the circles for nodes 508, 510, and 512 reflect, respectively, light, medium, and heavy resource utilization. This information can be used in selecting a selected route 516 from among the potential routes 1, 2, and 3.

The historical data 514 may include data that illustrates which paths are the fastest/slowest from a historical perspective. More specifically, DCF annotations are stored in a ledger as previously stated. As a result, the time required to transmit data from the time the data is generated to the time the data is delivered to an application can be determined from the annotations in the confidence information. Thus, a data is generated at time t[0], arrives at a first hop in the route at time t[1] and arrives at an application (e.g., at a software as a service (SaaS) node) at time t[n].

Over time, these delivery times can be averaged to determine expected or anticipated delivery times (e.g., by averaging the recorded delivery times). The route 1 is associated with an average or expected time T(x), the route 2 is associated with an average or expected time T(y), and the route 3 is associated with an average or expected time T(z).

The routing engine 502 may receive, as inputs, the potential routes 504 and their capabilities, the resource usage 506, and the historical data 514. Using these inputs, the routing engine 502 generates or selects a route 516 for transmitting incoming data.

In some examples, the selected route can be reconfirmed or reconfigured at each node in the path. Thus, the route initially selected at a gateway node may be changed at the next node in the route. For example, resource usage may change and a different path may be advisable, particularly if delivery time is an important factor in route selection. When a route is selected, the confidence information may be updated with corresponding annotations and/or confidence scores based on the selected route and/or the inputs that led to the selected route.

In one example, the routing engine 502 is reactive. Thus, the routing engine 502 may select a path automatically. Alternatively, an external module 518 may have access to the paths 504, the capabilities graph, the resource usage 506, and the historical data 514 and program the routing engine 502 (or the node) to make an immediate forwarding choice. In some examples, it may be possible to select a route in advance of receiving the data. Thus, data of a specific type or from a specific input may be routed in advance by selecting a route based on the inputs as described herein. The data type does not necessarily influence the process of selecting a route and, as a result, a route may be preselected. Further, as the historical data changes or as resource usage changes or as capabilities change, the route can be modified accordingly.

Figure 6:
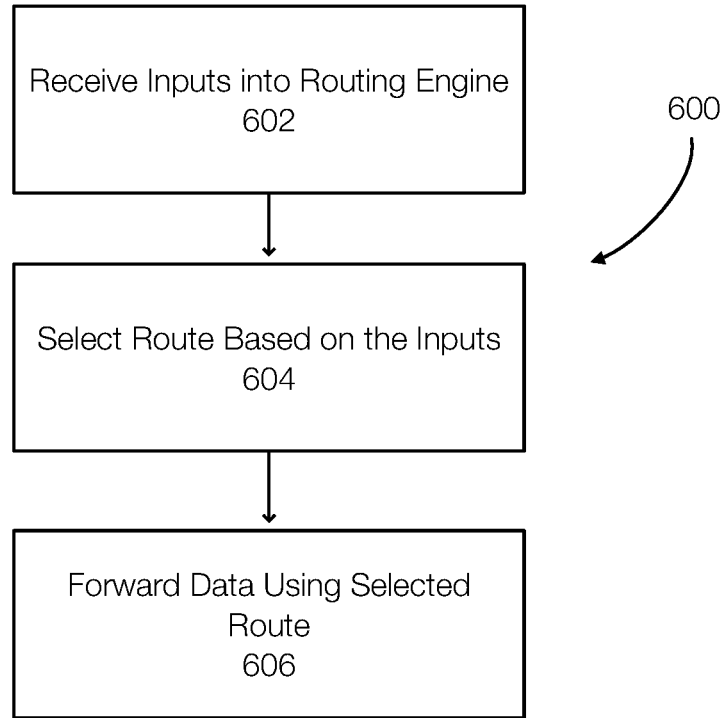
FIG. 6 discloses aspects of a method for routing data or packets in a data confidence fabric network.

FIG. 6 discloses aspects of delivering or routing data in a DCF. The method 600 includes receiving 602 inputs into a routing engine. The inputs include a capabilities graph that allow the routing engine (or node) to determine and consider the capabilities of nodes in multiple potential route or paths. The inputs may also include information about resource usage of nodes in these potential routes or paths. The inputs may also include historical data that illustrates the general delivery times (e.g., average or expected delivery times) for the potential routes or paths.

A route is selected 604 based on the inputs. In some examples, a route may be selected based a combination of one or more of route capabilities, resource usage, and/or expected delivery time. This may result in selecting a path where resource usage is light. The routing engine may consider each node in a potential route individually and/or the nodes collectively, the path with the historically fastest delivery time, the shortest path, or the like.

In some examples, the routing engine may also consider other factors. For example, the routing engine may need to select the best anticipated delivery time that allows a certain confidence score to be obtained or that allows certain trust insertion technologies to be applied.

With the benefit of the present disclosure, multiple permutations and conditions may be generated that allow a route to be selected in different ways. Further, the inputs may be weighted. For example, if the capabilities graph suggests route 1, the resource usage suggests route 2, and the historical data suggests route 3, the route selected by the routing engine may be the input having the highest weight. In another example, the routing engine may default to relying on a particular input, such as historical delivery times.

In another example, some of the inputs to the routing may not be available. For example, the historical data may not be available (or sufficiently reliable) until a history of data has been developed from which average or expected times can be more effectively determined.

Embodiments of the invention advantageously allow data to be delivered based on multiple factors including trust capabilities, congestion or resource usage, and or historical route performance. Once a route is selected, the data may be forwarded 606 using the selected route.

In some examples, a confidence score can be determined in advance for each potential route. This confidence score of each route may account for the delivery time of the route. This may be variable to account for congestion and other network conditions. In a re-active mode, the routing engine can determine confidence scores for each potential route in advance in a manner that accounts for capabilities, resource usage, and delivery time. Thus, the selected route may be the route with the best confidence score in one example.

Figure 7:
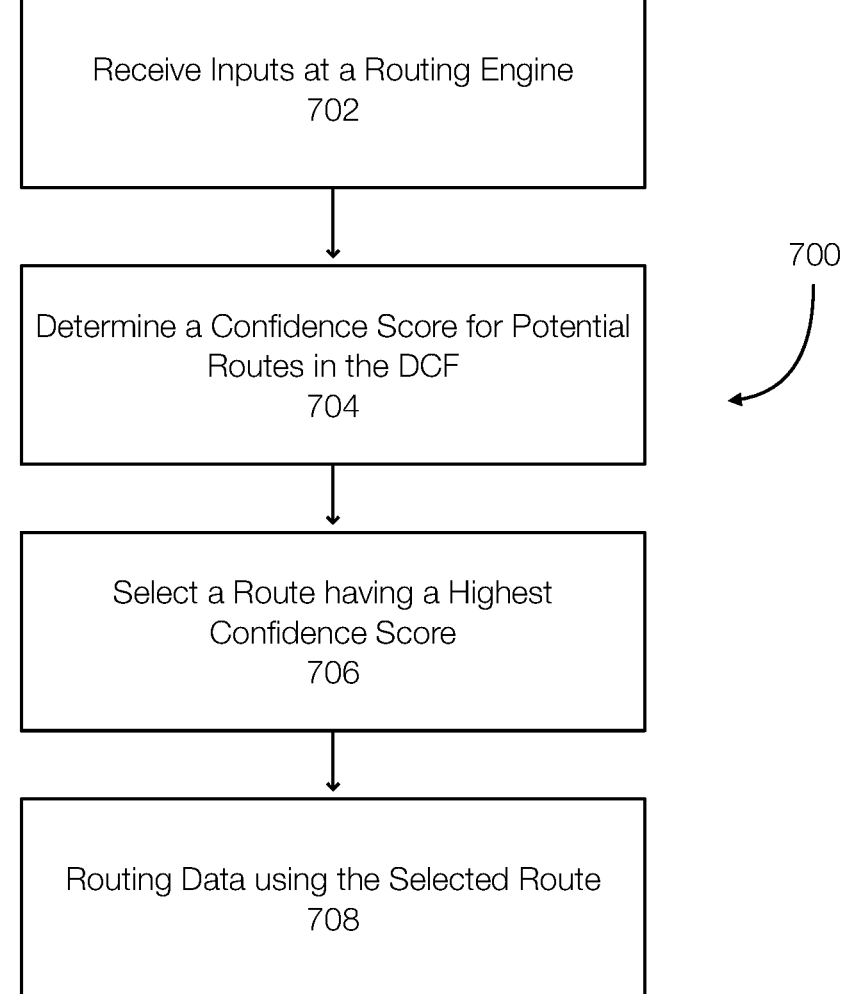
FIG. 7 discloses additional aspects of routing data or packets using confidence scores.

FIG. 7 further illustrates aspects of routing data using confidence scores. As previously stated, a confidence score of data can be changed based on aspects of delivering data such as delivery time. Factors that impact the delivery time include applied trust insertion technologies, resource usage (or network congestion), and historical routing success, which may be reflected in delivery time.

In one example, the confidence score of data and/or of routes can be determined in advance. The routing engine may be able to generate a confidence score of a route based on the capabilities of potential routes, current resource usage, and historical data. As a result, data can be routed using the route with the best confidence score.

The method 700 includes receiving 702 inputs at a routing engine. This may be done in advance of receiving data and may be performed iteratively in order to update the confidence scores of the potential routes. The inputs can be used to determine 704 a confidence score for each of the potential routes in the DCF. In one example, the confidence score is a score that will be added to data if the selected route is, in fact, used to forward the data. Alternatively, the confidence score may be a variable that changes as network conditions change (e.g., resource usage and expected delivery times). The route with the highest confidence score is selected 706 and used to forward or route 708 data in the DCF.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data network operations, routing operations, forwarding operations, route selection operations, confidence information generation/storing operations, or the like. More generally, the scope of the invention embraces any operating environment in which the disclosed concepts may be useful.

At least some embodiments of the invention provide for the implementation of the disclosed functionality in existing backup platforms, examples of which include the Dell-EMC NetWorker and Avamar platforms and associated backup software, and storage environments such as the Dell-EMC DataDomain storage environment. In general however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter or other environment.

Example cloud computing environments, which may or may not be public, include storage environments that may provide services/functions for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, containers, or virtual machines (VMs).

Particularly, devices in the operating environment may take the form of software, physical machines, containers, or VMs, or any combination of these, though no particular device implementation or configuration is required for any embodiment. Similarly, data system components such as databases, storage servers, storage volumes (LUNs), storage disks, servers, and the like, for example, may likewise take the form of software, physical machines, containers, or virtual machines (VMs), though no particular component implementation is required for any embodiment.

As used herein, the term 'data' is intended to be broad in scope. Thus, that term embraces, by way of example and not limitation, data produced in computing environments, by far edge nodes, sensors, user devices, or the like. Data may include time series data and may have various formats and structures.

It is noted that any operation(s) of any of methods disclosed herein may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Following are some further example embodiments of the invention. These are presented only by way of example and are not intended to limit the scope of the invention in any way.

Embodiment 1. A method comprising: receiving inputs at a routing engine operating at a node of a computing system, wherein the inputs include a capabilities graph that identifies trust insertion technologies of each node in the computing system, wherein the node is associated with potential routes for forwarding data in the computing system, selecting a route based on the inputs from potential routes, and routing the data in the computing system using the selected route.

Embodiment 2. The method of embodiment 1, wherein the trust insertion technologies include software trust insertion technologies and hardware trust insertion technologies.

Embodiment 3. The method of embodiment 1 and/or 2, wherein the inputs further include historical data and resource usage.

Embodiment 4. The method of embodiment 1, 2, and/or 3, further comprising updating the resource usage prior to selecting the route.

Embodiment 5. The method of embodiment 1, 2, 3, and/or 4, further comprising discovering the capabilities of each node in the computing system, the computing system comprising a data confidence fabric.

Embodiment 6. The method of embodiment 1, 2, 3, 4, and/or 5, wherein the routing engine evaluates the potential routes based on capabilities of nodes in each of the potential routes, a resource usage of each of the nodes in each of the potential routes, and an average delivery time for each of the potential routes.

Embodiment 7. The method of embodiment 1, 2, 3, 4, 5, and/or 6, wherein the selected route includes has a fastest expected delivery time and includes required capabilities.

Embodiment 8. The method of embodiment 1, 2, 3, 4, 5, 6, and/or 7, further comprising annotating confidence information associated with the data to include the selected route.

Embodiment 9. The method of embodiment 1, 2, 3, 4, 5, 6, 7, and/or 8, further comprising determining the potential routes for routing data, wherein the inputs include a capabilities graph that includes trust insertion technologies for each of the nodes in the computing system, a resource usage for each of the nodes, and historical delivery times for each potential route, wherein the selected route is selected based on an anticipated delivery time that considers capabilities of each of the potential routes, resource usage of the nodes in each of the potential routes, and historical delivery time of each of the potential routes, wherein the capabilities, the resource usage, and the historical data result are combined to select the selected route, wherein the selected route is expected to have a fastest delivery time from delivering the data from ingestion to an application.

Embodiment 10. The method of embodiment 1, 2, 3, 4, 5, 6, 7, 8, and/or 9, wherein selecting the route includes weighting the capabilities of the potential routes higher than performance of the potential routes or includes weighting the performance of the potential routes higher than the capabilities of the potential routes.

Embodiment 11. A method comprising: receiving inputs at a routing engine operating at a node of a computing system for potential routes, wherein the inputs include a capabilities graph that identifies trust insertion technologies of nodes in the potential routes, resource usage of nodes in the potential routes, and historical delivery times for each of the potential routes, determining a confidence score for each of the potential routes using the inputs, wherein the confidence score is based on the capabilities graph, the resource usage, and/or the historical delivery times, selecting a route that has a highest confidence score, and routing the data in the computing system using the selected route.

Embodiment 12. The method of embodiment 11, further comprising reselecting the route over time or periodically.

Embodiment 13 A system, comprising hardware and/or software, operable to perform any of the operations, methods, or processes, or any portion of any of these, disclosed herein.

Embodiment 14 A non-transitory storage medium having stored therein instructions that are executable by one or more hardware processors to perform operations comprising the operations of any one or more of embodiments 1-12.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, component, engine, agent, client, or the like may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 8:
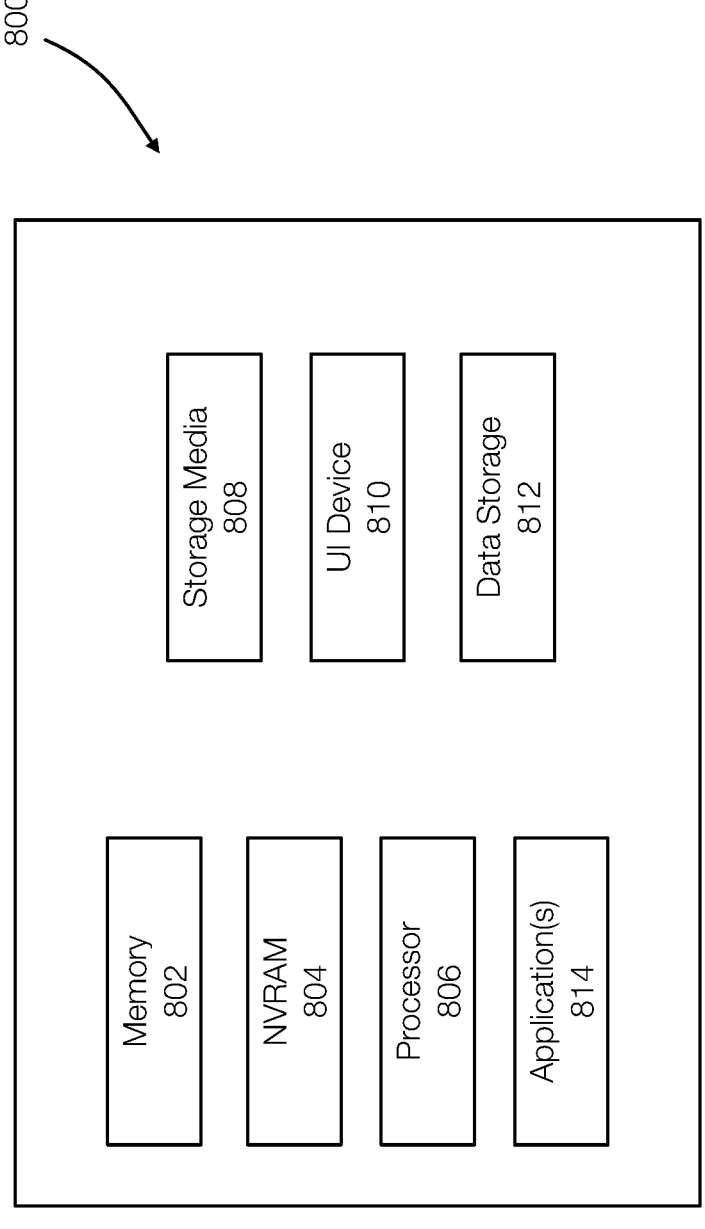
FIG. 8 discloses aspects of a computing device, system, or entity.

With reference briefly now to FIG. 8, any one or more of the entities disclosed, or implied, by the Figures, and/or elsewhere herein, may take the form of, or include, or be implemented on, or hosted by, a physical computing device, one example of which is denoted at 800. As well, where any of the aforementioned elements comprise or consist of a virtual machine (VM), that VM may constitute a virtualization of any combination of the physical components disclosed in FIG. 8.

In the example of FIG. 8, the physical computing device 800 includes a memory 802 which may include one, some, or all, of random access memory (RAM), non-volatile memory (NVM) 804 such as NVRAM for example, read-only memory (ROM), and persistent memory, one or more hardware processors 806, non-transitory storage media 808, UI device 810, and data storage 812. One or more of the memory components 802 of the physical computing device 800 may take the form of solid state device (SSD) storage. As well, one or more applications 814 may be provided that comprise instructions executable by one or more hardware processors 806 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:

receiving inputs at a routing engine operating at a node of a computing system, wherein the inputs include a capabilities graph that identifies trust insertion technologies of each node in the computing system, wherein the node is associated with potential routes for forwarding data in the computing system;

selecting, by the routing engine, a route based on the inputs including the capabilities graph and routing data, wherein each of the potential routes is associated with capabilities determined from the capabilities graph, wherein the routing data includes a resource usage of each of the nodes in each of the potential routes, and an average delivery time for each of the potential routes; and routing the data in the computing system using the selected route, wherein each of the nodes is configured to change or not change the selected route based on changes in the inputs.

2. The method of claim 1, wherein the trust insertion technologies include software trust insertion technologies and hardware trust insertion technologies and wherein the capabilities graph includes, for each of the nodes, the corresponding trust insertion technologies.

3. The method of claim 1, wherein the routing data further includes historical data.

4. The method of claim 3, further comprising updating the resource usage prior to selecting the route.

5. The method of claim 1, further comprising discovering the capabilities of each node in the computing system, the computing system comprising a data confidence fabric.

6. The method of claim 1, wherein the routing engine is configured to determine the selected route in advance of receiving the data or make a forwarding choice upon receiving the data.

7. The method of claim 1, wherein the selected route includes has a fastest expected delivery time and includes required capabilities.

8. The method of claim 1, further comprising annotating confidence information associated with the data to include the selected route.

9. The method of claim 1, further comprising determining the potential routes for routing data, wherein the capabilities graph includes trust insertion technologies for each of the nodes in the computing system, and the routing data includes a resource usage for each of the nodes, and historical delivery times for each potential route, wherein the selected route is selected based on an anticipated delivery time that considers capabilities of each of the potential routes, resource usage of each of the nodes in each of the potential routes, and historical delivery time of each of the potential routes, wherein the capabilities, the resource usage, and the historical delivery time are combined to select the selected route, wherein the selected route is expected to have a fastest delivery time from delivering the data from ingestion to an application.

10. The method of claim 9, wherein selecting the route includes weighting the capabilities of the potential routes higher than performance of the potential routes or includes weighting the performance of the potential routes higher than the capabilities of the potential routes.

11. A non-transitory storage medium having stored therein instructions that are executable by one or more hardware processors to perform operations comprising:

receiving inputs at a routing engine operating at a node of a computing system, wherein the inputs include a capabilities graph that identifies trust insertion technologies of each node in the computing system, wherein the node is associated with potential routes for forwarding data in the computing system;

selecting, by the routing engine, a route based on the inputs including the capabilities graph and routing data, wherein each of the potential routes is associated with capabilities determined from the capabilities graph, wherein the routing data includes a resource usage of each of the nodes in each of the potential routes, and an average delivery time for each of the potential routes; and routing the data in the computing system using the selected route, wherein each of the nodes is configured to change or not change the selected route based on changes in the inputs.

12. The non-transitory storage medium of claim 11, wherein the trust insertion technologies include software trust insertion technologies and hardware trust insertion technologies, and wherein the routing data further includes historical data and wherein the capabilities graph includes, for each of the nodes, the corresponding trust insertion technologies.

13. The non-transitory storage medium of claim 12, further comprising updating the resource usage prior to selecting the route and discovering the capabilities of each node in the computing system, the computing system comprising a data confidence fabric.

14. The non-transitory storage medium of claim 11, wherein the routing engine evaluates the potential routes based on capabilities of nodes in each of the potential routes based on the capabilities graph, a resource usage of each of the nodes in each of the potential routes, and an average delivery time for each of the potential routes, wherein the routing engine is configured to determine the selected route in advance of receiving the data or make a forwarding choice upon receiving the data.

15. The non-transitory storage medium of claim 11, wherein the selected route includes has a fastest expected delivery time and includes required capabilities.

16. The non-transitory storage medium of claim 11, further comprising annotating confidence information associated with the data to include the selected route.

17. The non-transitory storage medium of claim 11, further comprising determining the potential routes for routing data, wherein the capabilities graph includes trust insertion technologies for each of the nodes in the computing system, and the routing data includes a resource usage for each of the nodes, and historical delivery times for each potential route, wherein the selected route is selected based on an anticipated delivery time that considers capabilities of each of the potential routes, resource usage of each of the nodes in each of the potential routes, and historical delivery time of each of the potential routes, wherein the capabilities, the resource usage, and the historical delivery time are combined to select the selected route, wherein the selected route is expected to have a fastest delivery time from delivering the data from ingestion to an application.

18. The non-transitory storage medium of claim 11, wherein selecting the route includes weighting the capabilities of the potential routes higher than performance of the potential routes or includes weighting the performance of the potential routes higher than the capabilities of the potential routes.

19. A method comprising:

receiving inputs at a routing engine operating at a node of a computing system for potential routes for data, wherein the inputs include a capabilities graph that identifies trust insertion technologies of nodes in the potential routes, resource usage of nodes in the potential routes, and historical delivery times for each of the potential routes;

determining a confidence score for each of the potential routes using the inputs, wherein the confidence score is based on the capabilities graph, the resource usage, and/or the historical delivery times;

selecting a route that has a highest confidence score; and routing the data in the computing system using the selected route, wherein each of the nodes is configured to change the selected route based on changes in the inputs.

20. The method of claim 19, further comprising reselecting the route over time or periodically.

\* \* \* \* \*